(12) United States Patent
Liu et al.

(10) Patent No.: US 8,572,159 B2
(45) Date of Patent: Oct. 29, 2013

(54) MANAGING DEVICE MODELS IN A VIRTUAL MACHINE CLUSTER ENVIRONMENT

(75) Inventors: Benjamin Liu, Shanghai (CN); Xiaofeng Ling, Shanghai (CN); Yunhong Jiang, Shanghai (CN); Xin Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1418 days.

(21) Appl. No.: 10/580,557

(22) PCT Filed: Dec. 23, 2005

(86) PCT No.: PCT/CN2005/002304
§ 371 (c)(1),
(2), (4) Date: May 26, 2006

(87) PCT Pub. No.: WO2007/071116
PCT Pub. Date: Jun. 28, 2007

(65) Prior Publication Data
US 2009/0112972 A1    Apr. 30, 2009

(51) Int. Cl.
*G06F 15/16*    (2006.01)
(52) U.S. Cl.
USPC ........... 709/203; 709/213; 709/219; 709/248; 710/1; 710/8; 710/260; 717/171; 717/173; 717/176; 717/177; 178/1; 178/100; 719/321
(58) Field of Classification Search
USPC .......... 709/203, 213, 219, 248; 710/8, 260, 1; 717/171, 173, 176, 177; 718/1, 100; 719/321, 324
See application file for complete search history.

(56) References Cited

U.S. PATENT DOCUMENTS

| | | | | |
|---|---|---|---|---|
| 4,860,190 A | * | 8/1989 | Kaneda et al. | 710/49 |
| 5,996,026 A | * | 11/1999 | Onodera et al. | 710/3 |
| 6,075,938 A | * | 6/2000 | Bugnion et al. | 703/27 |
| 6,418,464 B1 | * | 7/2002 | Minow | 709/203 |
| 6,799,195 B1 | | 9/2004 | Thibault et al. | |
| 7,447,619 B2 | * | 11/2008 | Bartley et al. | 703/14 |
| 7,689,800 B2 | * | 3/2010 | Oshins et al. | 711/173 |

(Continued)

FOREIGN PATENT DOCUMENTS

CN    1012131 A    7/1987
JP    58195254 A    11/1983

OTHER PUBLICATIONS

International Search Report, International Application No. PCT/CN2005/002304; date mailed Oct. 26, 2006.

(Continued)

*Primary Examiner* — Michael Won
(74) *Attorney, Agent, or Firm* — Trop, Pruner & Hu, P.C.

(57) ABSTRACT

Machine-readable media, methods, apparatus and system are described. In some embodiments, a client platform may determine that an input/output operation related to a hardware device may happen in a virtual machine of the client platform and request a server platform via the network to handle the input/output operation related to the hardware. The server platform may receive the request from the client platform through the network; and identify a software device from a plurality of software devices in the server platform to handle the request, wherein the identified software device corresponds to the hardware device related to the input/output operation.

14 Claims, 6 Drawing Sheets

(56) References Cited

U.S. PATENT DOCUMENTS

| | | | |
|---|---|---|---|
| 7,779,424 B2* | 8/2010 | Cherkasova et al. | 719/321 |
| 7,865,893 B1* | 1/2011 | Omelyanchuk et al. | 718/1 |
| 8,266,238 B2* | 9/2012 | Zimmer et al. | 709/213 |
| 2003/0090704 A1* | 5/2003 | Hansen | 358/1.15 |
| 2003/0204648 A1* | 10/2003 | Arndt | 710/5 |
| 2003/0208642 A1* | 11/2003 | Desai et al. | 710/1 |
| 2004/0167996 A1* | 8/2004 | Takamura et al. | 710/5 |
| 2005/0076155 A1* | 4/2005 | Lowell | 710/1 |
| 2005/0076324 A1* | 4/2005 | Lowell et al. | 717/100 |
| 2005/0198303 A1* | 9/2005 | Knauerhase et al. | 709/227 |
| 2006/0107269 A1* | 5/2006 | Bantz et al. | 719/310 |
| 2007/0074208 A1* | 3/2007 | Ling et al. | 718/1 |

OTHER PUBLICATIONS

Written Opinion of the International Searching Authority, Patent Cooperation Treaty, Oct. 26, 2006, 3 pages, PCT/CN2005/002304, Beijing, China.

Ellen Moyse, International Preliminary Report on Patentability, Jun. 24, 2008, 1 page, PCT/CN2005/002304, Geneva, Switzerland.

* cited by examiner

MANAGING DEVICE MODELS IN A VIRTUAL MACHINE CLUSTER ENVIRONMENT

CROSS-REFERENCE TO RELATED APPLICATION

This application is a National Phase application of, and claims priority to, International Application No. PCT/CN2005/002304, filed Dec. 23, 2005, entitled "MANAGING DEVICE MODELS IN A VIRTUAL MACHINE CLUSTER ENVIRONMENT".

BACKGROUND

A virtual machine (VM) architecture logically partitions a physical machine, such that the underlying hardware of the machine is time-shared and appears as one or more independently operation virtual machines. A computer platform in a virtual machine cluster environment may comprise a virtual machine monitor (VMM) that may create a plurality of virtual machines and runs on the computer platform to facilitate for other software the abstraction of one or more virtual machines. The computer platform may further comprise a plurality of device models that may be virtualizations/simulations of real devices. The virtual machine monitor may manage resource usage for operations between the virtual machines and the device models, such as device related input/output operation and device model initiated interrupt. Examples for the virtual machine monitor may comprise a hybrid virtual machine monitor, a host virtual machine monitor and a hypervisor virtual machine monitor. Examples for the real device may comprise various input/output (I/O) devices, an interrupt controller, and an event timer, etc.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for managing device models in a virtual machine cluster environment. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
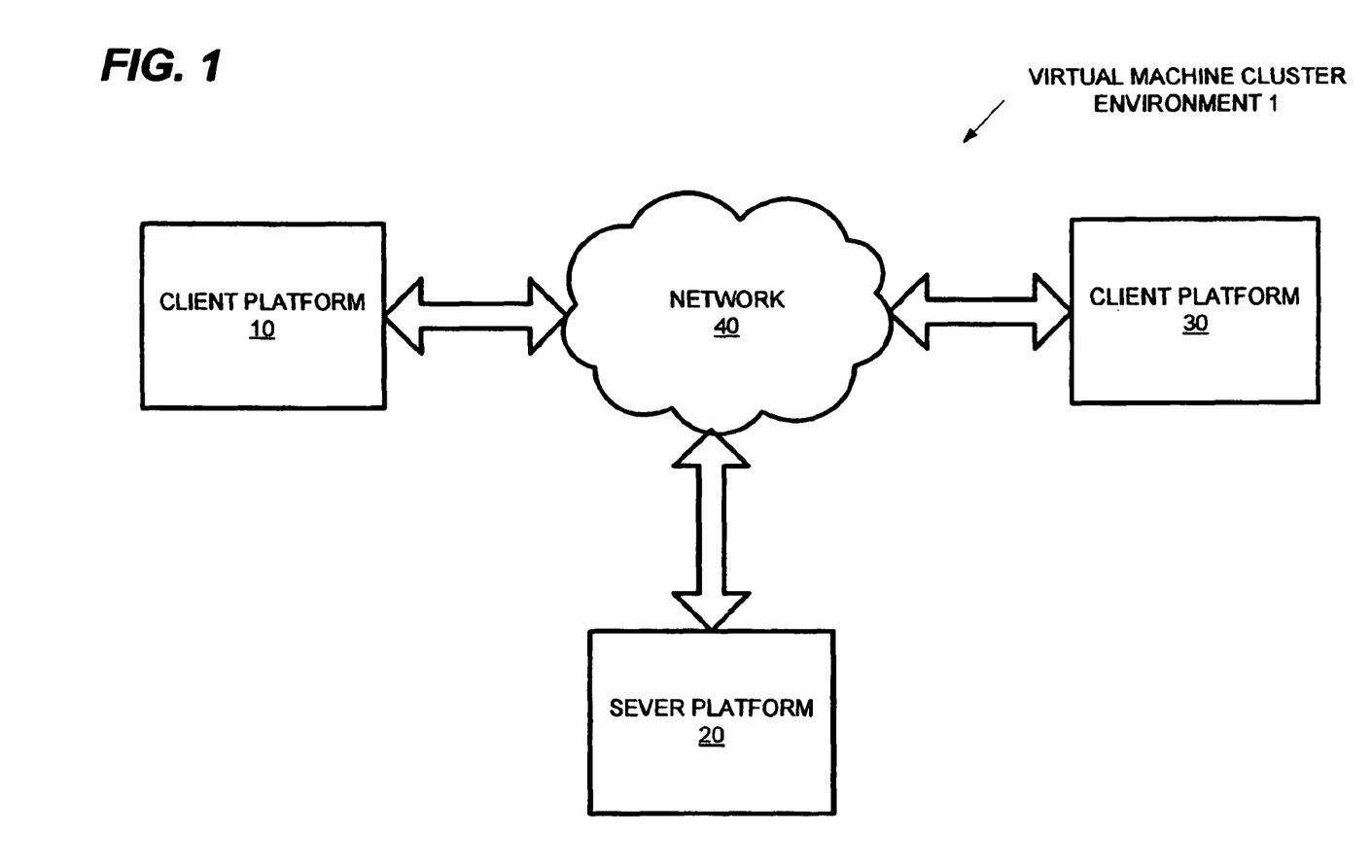
FIG. 1 shows an embodiment of a virtual machine cluster environment.

An embodiment of a virtual machine cluster environment 1 is shown in FIG. 1. The virtual machine cluster environment 1 may comprise a plurality of client platforms 10/30 and a server platform 20 that may connect with the client platforms 10/30 through a network 40, such as Ethernet, fiber channel or other like communications link. In the embodiment, the virtual machine cluster environment 1 may comprise any number of client platforms and server platforms.

Each of the client platforms 10/30 may host a plurality of virtual machines running their own guest operating system(s) and guest application software. The server platform 20 may provide a variety of services to the virtual machines of the client platforms, for example, but not limited to, device virtualization/simulation services and virtual machine management services. A non-exhaustive list of examples for the client platform 10/30 may include mainframe computer, mini-computer, personal computer, portable computer, laptop computer and other devices for transceiving and processing data. A non-exhaustive list of examples for the server platform 20 may include supercomputer, mainframe computer, workstation and other devices for transceiving and processing data.

Figure 2:
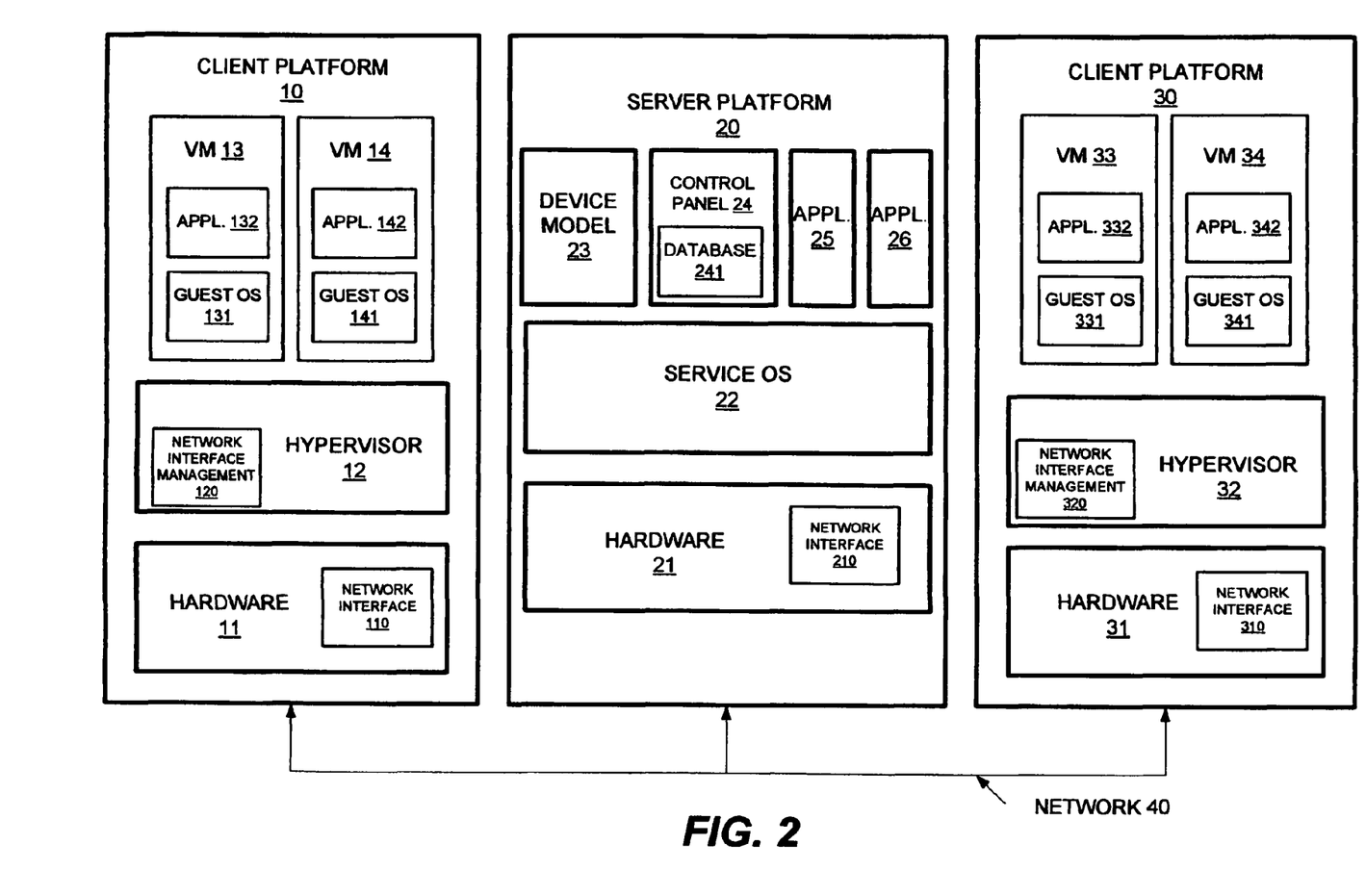
FIG. 2 shows an embodiment of structures of a server platform and a plurality of client platforms in the virtual machine cluster environment of FIG. 1.

An embodiment of structures for the client platforms 10/30 and the server 20 in the virtual machine cluster environment 1 is shown in FIG. 2. The client platforms 10/30 and server platform 20 may be configured according to the hybrid virtual machine monitor architecture.

In the embodiment, each of the client platforms 10/30 may comprise an underlying hardware machine 11/31 having one or more processors, memory, I/O devices, etc., wherein the I/O devices may further comprise a network interface to transceive data through the network 40, such as the network interface 110 of the client platform 10 and the network interface 310 of the client platform 30.

Each of the client platforms 10/30 may further comprise a hypervisor (or micro-hypervisor) 12/32, which is a kernel component configured according to the hybrid virtual machine monitor architecture and responsible for processor (s)/memory virtualization, interrupt handling and domain scheduling. The hypervisor 12/32 may further comprise a network interface management core 120/320 to manage the network interface 110/310 of the underlying machine. Examples for the hypervisor may comprise Xen's hypervisor, Virtual PC's hypervisor, and the like.

Each of the client platforms 10/30 may further comprise a plurality of guest software images running on a plurality of virtual machines created and managed by the hypervisor 12/32, for example, guest operating systems 131/141 and guest applications 132/142 running on the virtual machines 13/14 of the client platform 10, and guest operating systems 331/341 and guest applications 332/342 running on the virtual machines 33/34 of the client platform 30. The guest operating systems 131, 141, 331 and 341 may be different with each other. The number of guest operating systems running on the client platform may depend on utilization of processor/memory resources and device resources. For example, the number of guest operating systems may be low if the client platform utilizes the processor/memory resources more intensively compared to device utilization. However, the number of guest operating systems may be high if the client platform utilizes the device resources more intensively compared to processor/memory utilization. Examples for the guest operating system may comprise Linux, Windows, FreeBSD Unix, etc.

The server platform 20 may comprise an underlying hardware machine 21 having one or more processors, memory, I/O devices, etc., wherein the I/O devices may further comprise a network interface 210 to transceive data through the network 40. The server platform 20 may be loaded with a service operating system 22 configured according to the hybrid virtual machine monitor architecture. The service operating system 22 may respectively interact with the hypervisors 12/32 of the client platforms 10/30 via the network 40 to service the plurality of virtual machines in the client platforms 10/30. Examples for the service operating system may comprise Linux, Windows, FreeBSD Unix, etc.

The server platform 20 may be further loaded with a plurality of device models 23 and a control panel 24. The device models 23 may be virtual devices that may be created or defined for example according to the hybrid virtual machine monitor architecture. In some embodiments, because of device virtualization/simulation nature, the device models 23 may not be connected to or represented by a real instance of a device, and may not be reflected in a real device that is connected to a hardware component. Examples for the device models 23 may comprise, but not limited to, various I/O devices, an interrupt controller, an event timer, etc.

The device models 23 may work with the service operating system 22 to provide device virtualization/simulation service to the virtual machines of the client platforms 10/30 via the network 40, including hosting device related operation from/ to the virtual machines, such as device related I/O operation and device model initiated interrupt. In some embodiments, the device models in the virtual machine cluster environment may be centralized in the server platform 20. However, in other embodiments, the client platform 10/30 may keep some of the device models, such as the device models frequently used by the virtual machines of the client platform. For example, the client platform 10/30 may keep the device models inside of the hypervisor 11/31.

The control panel 24 may work with the service operating system 22 to manage the virtual machines of the client platforms 10/30 via the network 40. In an embodiment, the control panel 24 may comprise a database 241 containing identifiers of the virtual machines (or the guest operating systems running on the virtual machines), the hypervisors and the client platforms in the virtual machine cluster environment that are served by the server platform 20; and as another possibility the database can be created or updated on fly. In an embodiment, a virtual machine of the client platform 10/30 may send a request for a device related input/output operation to the server platform 20 via the network 40. The control panel 24 and the service operating system 22 may identify a corresponding device model from the plurality of device models 23 to host the request, and further construct a feedback packet by incorporating a result of the input/output operation from the device model with identifier(s) to identify the virtual machine that has sent the operation request. In another embodiment, a device model may initiate an interrupt for a virtual machine of the client platform 10/30. The control panel 24 and the service operating system 22 may construct an interrupt packet by incorporating the interrupt instruction with identifier(s) to identify the virtual machine that may handle the interrupt. The identifier(s) may comprise a virtual machine identifier, a hypervisor identifier and/or client platform identifier. In addition, the control panel 24 may perform virtual machine management for other aspect, such as virtual machine operation management including virtual machine launching management, virtual machine shutdown management, virtual machine migration management, virtual machine suspend management, etc.

The server platform 20 may further be loaded with a plurality of application software running on the service operating system 22, such as applications 25 and 26.

Other embodiments may implement other technologies to the structure depicted in FIG. 2. In an embodiment, the server platform 20 may further comprise a hypervisor running between the underlying hardware machine 21 and the service operating system 22. In such case, the server platform 20 may further comprise one or more virtual machine(s) defined by the hypervisor and the service operating system. In another embodiment, console devices (e.g., frequently used input/ output devices such as a keyboard, a mouse, a video device, etc.) may be centralized in the underlying hardware machine 21 of the server platform 20. In such case, the client platform 10/30 may not be provided with the console devices.

Figure 3:
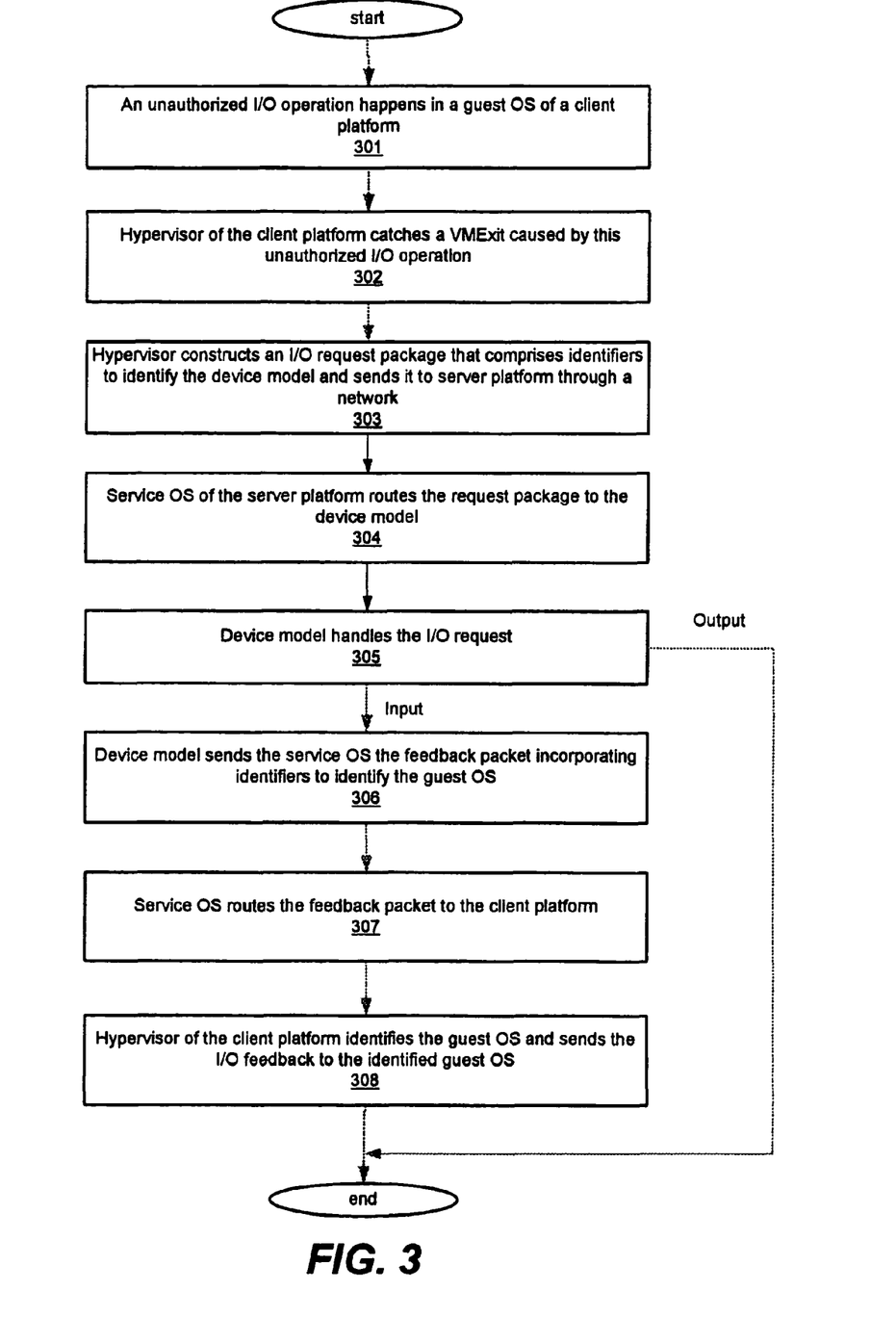
FIG. 3 shows an embodiment of a method of implementing a device related input/output operation in the virtual machine cluster environment of FIG. 2.

FIG. 3 shows an embodiment of a method of implementing a device related input/output operation in the virtual machine cluster environment 1.

In the embodiment, an unauthorized input/output operation for inputting a data from a device (input operation) or outputting a data to the device (output operation) happens in a guest operating system running on a virtual machine of a client platform (e.g., guest operating system 131 running on the virtual machine 13 of the client platform 10), and a corresponding device driver in the guest operating system may execute an 'IN' instruction for input operation or 'OUT' instruction for output operation, which may cause a trap into the hypervisor of the client platform in block 301, because the guest operating system is depriviledged.

In block 302, the hypervisor of the client platform may perceive the unauthorized I/O operation happened in the guest operating system through a virtual machine exit, which is a transition from non-root VMX operation in the virtual machine to root VMX operation in the hypervisor.

In block 303, the hypervisor of the client platform may construct an I/O request packet and send the packet to the server platform 20 through the network 40. In an embodiment, the I/O request may further comprise identifier(s) to identify a device model in the server platform 20 corresponding to the device that is related to the I/O operation in the guest operating system of the virtual machine. The identifier(s) may comprise a device model identifier and/or a server platform identifier (e.g., a network ID for the server platform). In response to receiving the I/O request packet, the service operating system 22 may identify the corresponding device model from the plurality of device models 23 under control from the control panel 24 and route the I/O request packet to the identified device model in block 304.

In block 305, the identified device model may handle the I/O request. For output request, the data in the I/O request packet may be output to the identified device model. Depending upon inter-platform communication interface definition, the server platform 20 may send back a finish notification to the I/O requester (i.e., the client platform 10/30) to notify finish of the 'OUT' operation. However, for input request, the identified device model 23 may obtain a feedback to the input request, for example, through cooperating with the service operating system 22 and the underlying hardware 21 of the service platform 20, and send a feedback packet to the service operating system 22 in block 306. The feedback packet may incorporate the feedback with identifier(s) to identify the guest operating system (or virtual machine) of the client platform that is executing the I/O operation. In an embodiment, the identifier(s) may comprise a guest operating system identifier (or virtual machine identifier) and/or a client platform identifier (e.g., a network ID for the client platform). In another embodiment, if the client platforms in the virtual machine cluster environment 1 comprises different types of hypervisors, e.g., Xen hypervisor, Virtual PC's hypervisor, etc., then the identifier may further comprise a hypervisor identifier to identify the different hypervisors.

In block 307, under control from the control panel stored with identifiers of the guest operating systems (or virtual machines), the hypervisors and the client platforms in the virtual machine cluster environment 1, the service operating system 22 may route the feedback packet to the client platform that has sent the I/O request based upon the identifier(s) in the feedback packet. In block 308, the hypervisor of the client platform may identify the guest operating system (or virtual machine) executing the corresponding I/O operation and send the feedback packet to the identified guest operating system through a virtual machine entry, which is another transition from the root VMX operation in the hypervisor to the non-root VMX operation in the virtual machine.

Figure 4:
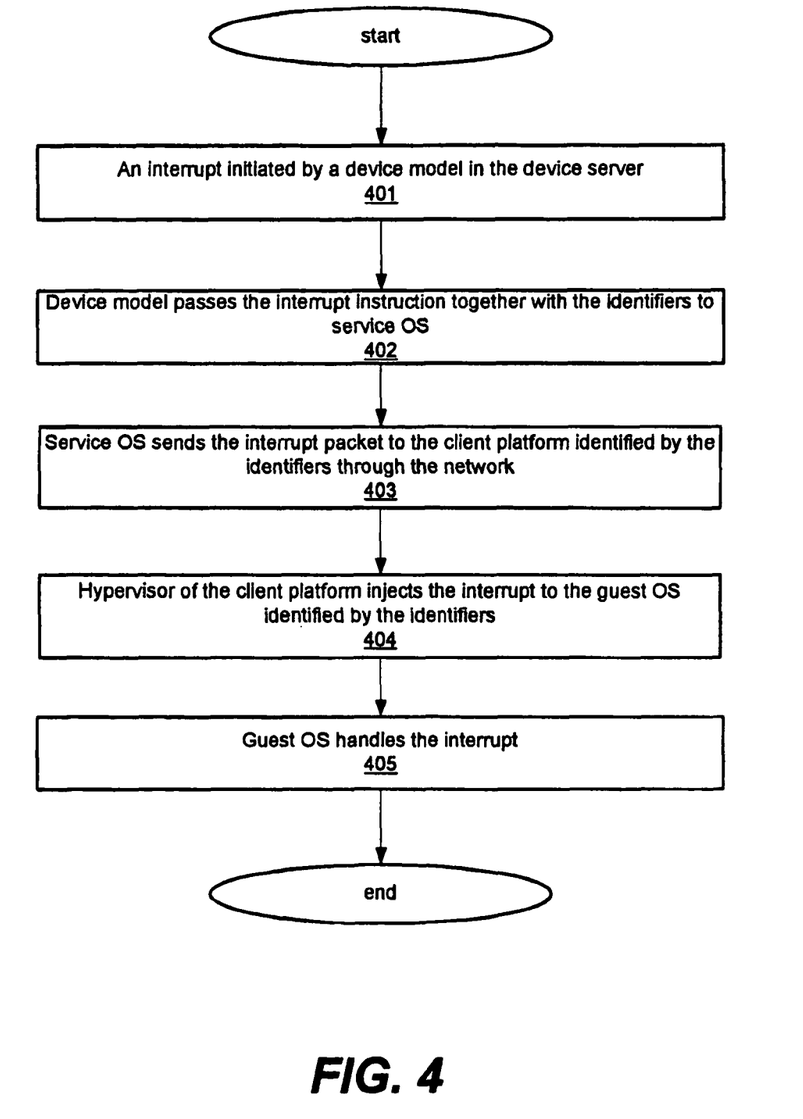
FIG. 4 shows an embodiment of a method of implementing a device model initiated interrupt in the virtual machine cluster environment of FIG. 2.

An embodiment of a method of implementing a device model initiated interrupt in the virtual machine cluster environment 1 is shown in FIG. 4.

In block 401, one of the device models 23 in the server platform 20 initiate an interrupt for a guest operating system of a client platform in the virtual machine cluster environment 1. In block 402, the device model passes an interrupt packet incorporating the interrupt instruction as well as identifier(s) to identify the guest operating system (or virtual machine) of the client platform to the service operating system 22. In an embodiment, the identifier(s) may comprise a guest operating system identifier (or virtual machine identifier) and/or a client platform identifier (e.g., a network ID for the client platform). In another embodiment, if the client platforms in the virtual machine cluster environment 1 comprises different types of hypervisors, e.g., Xen hypervisor, Virtual PC's hypervisor, etc., then the identifier may further comprise a hypervisor identifier to identify the different hypervisors.

In block 403, under control from the control panel 24, the service operating system 22 may send the interrupt packet to the client platform identified by the identifier(s) in the interrupt packet. The hypervisor of the client platform may further identify the guest operating system based upon the interrupt packet and inject the interrupt to the identified guest operating system through the virtual machine entry (block 404), so that the guest operating system may handle the interrupt (block 405).

Figure 5:
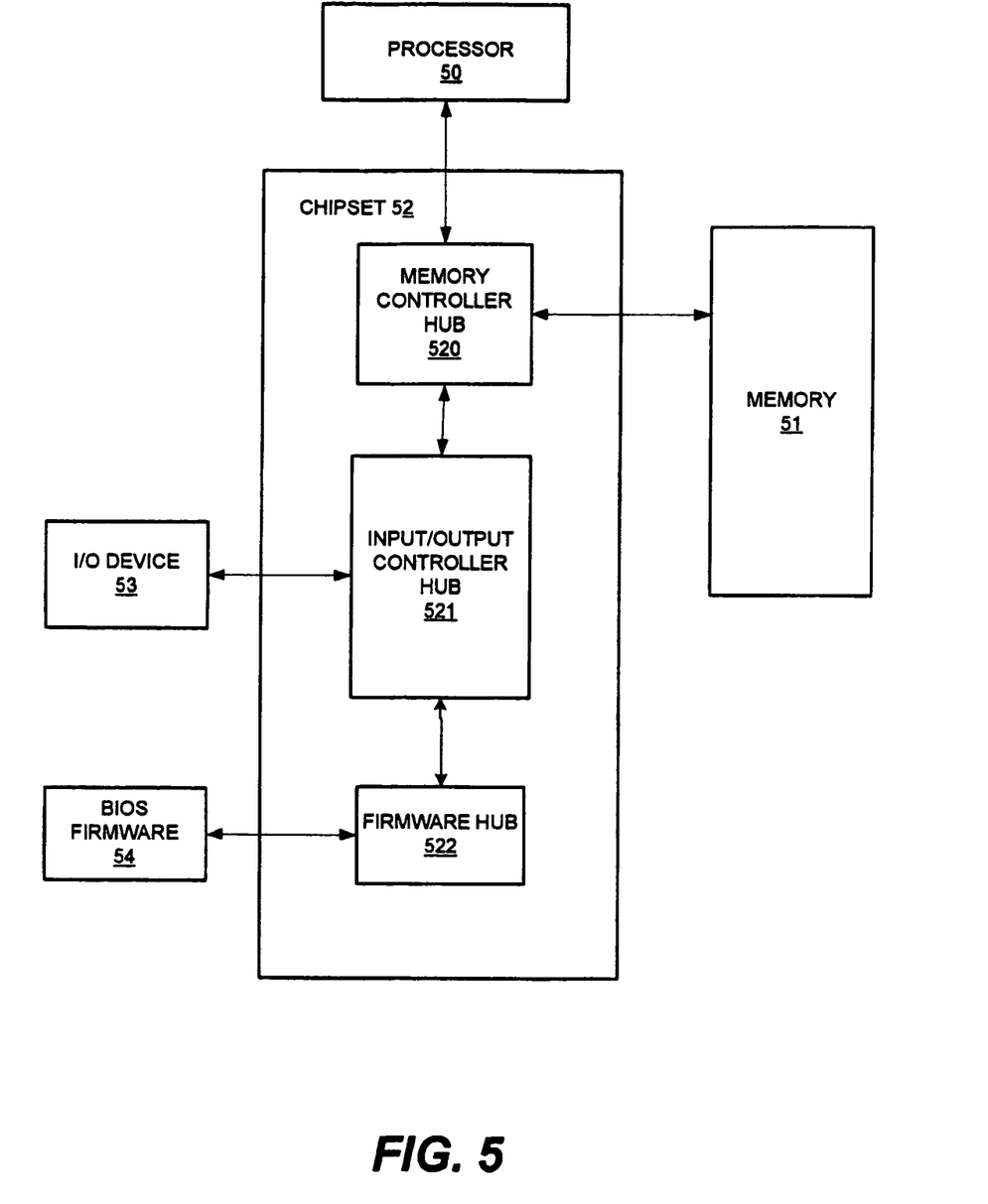
FIG. 5 shows an embodiment of a computer platform that may be implemented as a platform within the virtual machine cluster environment of FIG. 2.

FIG. 5 shows an embodiment of a computer platform that may be implemented as a platform in the virtual machine cluster environment 1.

In an embodiment, the computing platform may comprise one or more processors 50, memory 51, chipset 52, I/O device 53, BIOS firmware 54 and the like. The one or more processors 50 are communicatively coupled to various components (e.g., the memory 51) via one or more buses such as a processor bus. The processors 50 may be implemented as an integrated circuit (IC) with one or more processing cores that may execute codes under a suitable architecture, for example, including Intel® Xeon™, Intel® Pentium™, Intel® Itanium™ architectures, available from Intel Corporation of Santa Clara, Calif.

In an embodiment, the memory 51 may store codes to be executed by the processor 50. A non-exhaustive list of examples for the memory 51 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), flash memory devices, and the like.

In an embodiment, the chipset 52 may provide one or more communicative path among the processor 50, memory 51 and various components, such as the I/O device 53, peripheral component 54, and BIOS firmware 55. The chipset 52 may comprise a memory controller hub 520, an input/output controller hub 521 and a firmware hub 522.

In an embodiment, the memory controller hub 520 may provide a communication link to the processor bus that may connect with the processor 50 and to a suitable device such as the memory 51. The memory controller hub 520 may couple with the I/O controller hub 521 that may provide an interface to the I/O devices 53. A non-exhaustive list of examples for the I/O devices 53 may comprise a keyboard, a mouse, a storage device, a video device, an audio device, a network interface, and the like.

In an embodiment, the memory controller hub 520 may communicatively couple with a firmware hub 522 via the input/output controller hub 521. The firmware hub 522 may couple with the BIOS firmware 54 that may store routines that the computing platform executes during system startup in order to initialize the processors 50, chipset 52, and other components of the computing platform. Moreover, the BIOS firmware 54 may comprise routines or drivers that the computing platform may execute to communicate with one or more components of the compute platform.

In an embodiment, the computer platform as depicted in FIG. 5 may perform as a client 10/30. The memory 51 may store software images such as a hypervisor, guest operating systems, guest applications, etc. In another embodiment, the computer platform as depicted in FIG. 5 may perform as a server platform 20. The memory 51 may store software images such as a service operating system, device models, control panel, and optionally various applications, etc.

Figure 6:
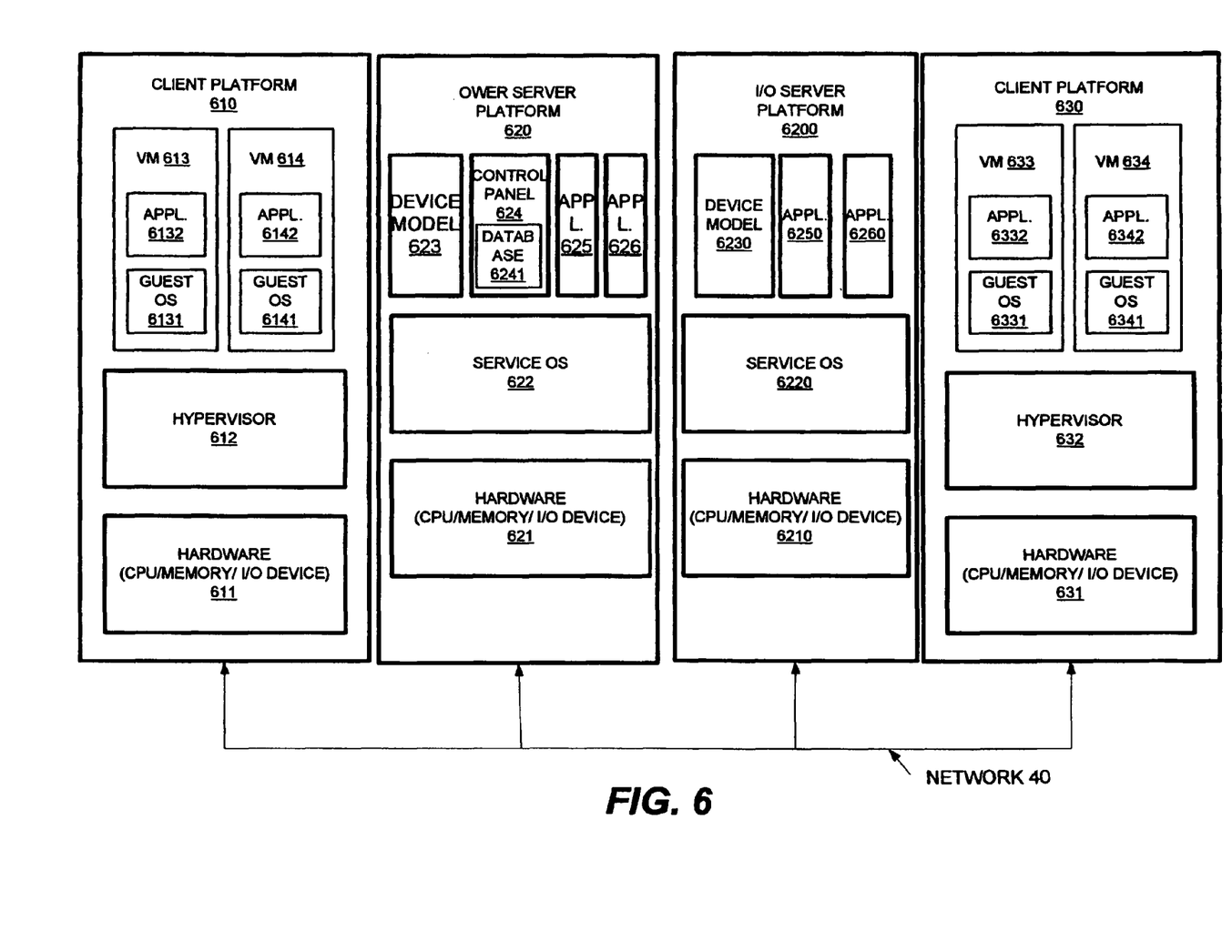
FIG. 6 shows another embodiment of structures of a server platform and a plurality of client platforms in the virtual machine cluster environment of FIG. 1.

Another embodiment for the server platform and client platform structures in the virtual machine cluster environment 1 is depicted in FIG. 6. As depicted, more than one server platforms (e.g., owner server platform 620 and I/O server platform 6200) may connect with the client platform 10/30 through the network 40 to provide them with device virtualization/simulation services. The owner server platform 620 has similar structure as the server platform 20 and the I/O server platform 6200 is loaded with a plurality of device models 6230 so that the server platforms 620/6200 may provide robust device virtualization services to their client platforms. Functionalities of the control panel 624 may encompass management of the device models 6230 in the I/O server platform 6200. In an embodiment, the control panel 624 may perform the device model identification based upon an I/O request packet from the client platform 10/30. In such case, the owner server platform 620 may first receive the I/O request packet from the client platform 10/30 via the network 40 and route the I/O request packet to the device model 6230 in the I/O service platform 6200 after analyzing the identifier(s) in the I/O request packet. In another embodiment, the device model 6230 may construct an I/O feedback packet or an interrupt packet by incorporating an identifier(s) to identifier the guest operating system (or virtual machine) in the intended client platform 10/30 under supervision from the control panel 624.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention. For example, although the above embodiments are described according to the hybrid virtual machine monitor architecture, the present invention may be applied to other kinds of virtual machine monitor architectures, such as a host virtual machine monitor.

What is claimed is:

1. A method comprising:
    recognizing an input/output operation involving an input/output device not available on a client platform; and
    requesting a server platform to handle the operation by specifying a device model the server platform should use to handle the input/output operation using an input/output device on the server platform,
    wherein a client network interface receives an interrupt instruction; and
    a virtual machine monitor identifies another virtual machine from a plurality of virtual machines on the client platform based upon the interrupt instruction and injects the interrupt into the identified another virtual machine.

2. The method of claim 1 further comprising:
    determining that an input/output operation related to an input/output device happens during execution of an application on a virtual machine of the client platform; and
    requesting the server platform via the network to handle the input/output operation through a client network interface of the client platform, wherein the request comprises a device module identifier to identify a device module from a plurality of device modules in the server platform to handle the input/output operation, wherein the device module is a virtual device corresponding to the input/output device.

3. The method of claim 2, wherein the request comprises a server platform identifier to identify the server platform.

4. The method of claim 2, further comprising:
    receiving a feedback for the input/output operation from the server platform through the network, the feedback comprising a virtual machine identifier to identify the virtual machine in the client platform that is executing the input/output operation; and
    sending the feedback to the virtual machine identified by the virtual machine identifier.

5. The method of claim 2, further comprising:
    receiving via the network an interrupt instruction issued by a device module of the server platform, the interrupt instruction comprising a virtual machine identifier to identify a virtual machine to perform the interrupt instruction; and
    injecting the interrupt instruction into the virtual machine identified by the virtual machine identifier.

6. A non-transitory computer-readable medium comprising a plurality of instructions which when executed result in a client platform:
    recognizing an input/output operation involving an input/output device not available on a client platform; and
    requesting a server platform to handle the operation by specifying a device model the server platform should use to handle the input/output operation using an input/output device on the server platform,
    wherein a client network interface receives an interrupt instruction; and
    a virtual machine monitor identifies another virtual machine from a plurality of virtual machines on the client platform based upon the interrupt instruction and injects the interrupt into the identified another virtual machine.

7. The non-transitory computer-readable medium of claim 6 further comprising a plurality of instructions which when executed result in a client platform:
    determining that an input/output operation related to an input/output device happens during execution of an application on a virtual machine of the client platform; and
    requesting the server platform via the network to handle the input/output operation through a client network interface of the client platform, wherein the request comprises a device module identifier to identify a device module from a plurality of device modules in the server platform to handle the input/output operation, wherein the device module is a virtual device corresponding to the input/output device.

8. The non-transitory computer-readable medium of claim 7, wherein the request further comprise a server platform identifier to identify the server platform.

9. The non-transitory computer-readable medium of claim 7, wherein the plurality of instructions further result in the client platform:
    receiving a feedback for the input/output operation from the server platform through the network, the feedback comprising a virtual machine identifier to identify the virtual machine in the client platform that is executing the input/output operation; and
    sending the feedback to the virtual machine identified by the virtual machine identifier.

10. The non-transitory computer-readable medium of claim 7, wherein the plurality of instructions further result in the client platform:
    receiving an interrupt instruction issued by a device module from the plurality of devices modules in the server platform through the network, the interrupt instruction comprising a virtual machine identifier to identify a virtual machine to perform the interrupt instruction; and injecting the interrupt instruction to the virtual machine identified by the virtual machine identifier.

11. A system, comprising a client platform comprising:

a plurality of virtual machines; and a virtual machine monitor to determine that an input/output operation related to an input/output device happens during execution of an application on a virtual machine of the plurality of virtual machines and construct a request for the input/output operation;

a client network interface to send the request through a network; and said client platform to recognize an input/output operation involving an input/output device not available on a client platform and request a server platform to handle the operation by specifying a device model the server platform should use to handle the input/output operation using an input/output device on the server platform, wherein the client network interface further receives an interrupt instruction; and the virtual machine monitor further identifies another virtual machine from the plurality of virtual machines based upon the interrupt instruction and inject the interrupt into the identified another virtual machine.

12. The system of claim 11, wherein the request further comprises a device module identifier to identifier the device module in the server platform.

13. The system of claim 11, wherein the identified device module in the server platform is further to obtain a result for the input/output operation, and construct a feedback with the result and a virtual machine identifier to identify the virtual machine in the client platform under control from the controller, and the server network interface is further to send the feedback to the client platform through the network.

14. The system of claim 11, wherein the client network interface is further to receive a feedback for the input/output operation from the server platform through the network; and the virtual machine monitor is further to identify the virtual machine in the client platform that is executing the input/output operation based upon the feedback and send the feedback to the identified virtual machine.

* * * * *